Patented Jan. 30, 1940

2,188,322

UNITED STATES PATENT OFFICE 2,188,322

NITROCELLULOSE COMPOSITION OF REDUCED INFLAMMABILITY

Harold James Tattersall, Ardrossan, Scotland, assignor to Imperial Chemical Industries Limited, a corporation of Great Britain No Drawing. Application July 30, 1937, Serial No. 156,603. In Great Britain August 10, 1936

10 Claims. (Cl. 134—79)

The present invention relates to the production of improved nitrocellulose compositions and particularly to the production of nitrocellulose compositions having reduced inflammability.

The invention has for an object the preparation of nitrocellulose compositions of reduced inflammability. A further object is the preparation of nitrocellulose films of improved flexibility. A still further object is the production of nitrocellulose film of good transparency and reduced inflammability. A still further object is the production of nitrocellulose film of reduced inflammability which has an increased tolerance for filling ingredients. Other objects will appear hereinafter.

I have found that the presence of a metallic or non-metallic salt of dimethyl phosphoric acid in a gelatinized nitrocellulose composition reduces the inflammability characteristics of the films, coatings or other products obtained after evaporation of any volatile constituents.

The present invention consists, therefore, in gelatinized nitrocellulose compositions in which, for the purpose of reducing the inflammability and optionally for the purpose of improving the other properties of the composition as hereinafter described, there is included a salt of dimethyl phosphoric acid.

Certain organic salts of dimethyl phosphoric acid, when incorporated with gelatinized nitrocellulose, permit of the formation of films or other products which are substantially transparent; and these salts also possess a plasticizing action resulting in the production of films of improved flexibility. As examples of such salts, there may be mentioned the dimethyl phosphates of ammonium, cadmium and cerium and also of hydrazine, phenylurea, diphenylurea, urethane, diphenyl-guanidine, triethanolamine and methyl allophanate, etc. Such salts are preferably those derived from organic bases of low molecular weight. It is generally preferred, moreover, to employ salts derived from organic bases which contain within the molecule an ester group or other active solvent group. The transparent flexible fire-resistant compositions prepared with the aid of the described salts of dimethyl phosphoric acid are particularly suitable in the production of Celluloid-like materials, for example in the manufacture of cinema or photographic film. The compositions of my invention are of importance in photographic film which has a light sensitive layer upon at least one side thereof.

Certain other salts of dimethyl phosphoric acid, when incorporated with gelatinized nitrocellulose, form films or other products having varying degrees of translucency or opacity. Suitable proportions of these salts may be added without causing embrittlement of the films formed from the compositions in question and some of them at least also possess a plasticizing action on the films. As examples of salts there may be mentioned certain non-metallic salts, e. g. the salts of urea and guanidine, and certain metallic salts, e. g. those of calcium, barium, magnesium, lead, aluminum, zinc, copper, cobalt, manganese, antimony and thallium. The films obtained from nitrocellulose compositions containing such metallic or nonmetallic salts may be rendered less opaque or even in some cases transparent by the incorporation of a plasticizer with the nitrocellulose or other similar non-volatile material. In the manufacture of transparent or translucent films, it is preferred to avoid the inclusion of any substantial proportion of inflammable material of a plasticizing nature, e. g. camphor or dibutyl phthalate, and for this reason, therefore, it is preferred to use those salts which yield directly a product of the desired degree of transparency and flexibility.

In manufacturing relatively opaque compositions, it may, however, be desirable to employ such salts of dimethyl phosphoric acid which possess a plasticizing action in order to increase the tolerance of the composition for filling ingredients, pigments and the like.

The salts of dimethyl phosphoric acid in general confer no undesirable odor to the plastic compositions and this property presents a distinct advantage, since many of the flame-retarding ingredients which have hitherto been proposed have been organic compounds characterized by an objectionable odor or other objectionable properties which can be avoided by choosing a suitable salt of dimethyl phosphoric acid. Other proposals have involved the use of inorganic fire-retarding agents but they, on the whole, yielded disappointing results since the large amount of such material required has usually resulted in embrittlement of the plastic. The high tolerance which is conferred by those salts of dimethyl phosphoric acid which confer a plasticizing action on the nitrocellulose may thus be a desirable property, even when it is desired to prepare a plastic containing a considerable proportion of nitrocellulose.

I have further found that the inflammability of compositions containing nitrocellulose and a salt of dimethyl phosphoric acid may be further reduced by the incorporation of a relatively small proportion of a number of inorganic compounds, several of which have no injurious effect upon the clarity of the film obtained. These accessory compounds are stable colorless salts soluble in organic solvents and free from oxidizing action. Among these compounds there may be mentioned ammonium hypophosphite, calcium tartrate, mercuric potassium iodide, sodium fluoride, stannic chloride, titanium sulphate, uranyl acetate and barium hypophosphite. It is particularly desirable to incorporate a small proportion of these compounds along with the simple urethane salts of dimethyl phosphoric acid since a good reduction in inflammability occurs.

The invention is further illustrated but is not intended to be limited by the following examples in which the parts given are parts by weight.

Example I

Spirit-wet Celluloid nitrocotton corresponding to 100 parts of nitrocellulose is dissolved in acetone, and 12½ parts of the lead salt of dimethyl phosphoric acid, in the form of a paste in alcohol, were added, whereupon the mixture was cast into the form of a film from which the volatile ingredients were evaporated in the usual way. The resulting film has a translucent shimmering appearance and was more flexible than a nitrocellulose film.

Example II

Spirit-wet nitrocotton corresponding to 100 parts dry industrial nitrocotton; 160 parts of a pigment paste containing an ochre pigment and castor oil in the ratio 10:6; 50 parts of the calcium salt of dimethyl phosphoric acid; and 90 parts of castor oil were employed as non-volatile ingredients. The calcium salt and the pigment paste were ground together and introduced into an incorporating machine containing the nitrocellulose previously gelatinized with at least a portion of a volatile solvent mixture, the remaining castor oil being introduced subsequently. The resulting dope was spread on to a fireproofed textile backing in known manner.

Example III

Spirit-wet nitrocotton corresponding to 100 parts dry weight of Celluloid nitrocotton are dissolved in acetone together with 25 parts of the dimethyl phosphate of urethane. To the mixture there is added 2 parts of ammonium hypophosphite dissolved in alcohol. The solution is cast in known manner, to yield a film of good transparency. Light sensitive emulsions may be coated thereon in the usual manner upon at least one side.

Example IV

Spirit-wet nitrocotton corresponding to 100 parts dry weight of Celluloid nitrocotton are dissolved in acetone together with 25 parts of the dimethyl phosphate of urethane. To the mixture there is added 2 parts of ammonium hypophosphite dissolved in alcohol. The solution is cast in known manner, to yield a film of good transparency. A light sensitive emulsion such as a gelatine silver halide emulsion which may contain other agents which extend the sensitivity of the film are then coated upon at least one side of the film. The resulting film is of excellent transparency and has a good degree of flexibility. The film has its inflammability reduced to a surprising degree.

Any proportion of dimethyl phosphates will have some fireproofing action but this is seldom of practical value until their proportion reaches 10 per cent of the total composition. The upper limit to the proportion of salts varies with the salt used. When using urethane dimethyl phosphate a proportion higher than 25 per cent produces a film which is too soft. Salts which have less plasticizing action than the urethane salt could be present in higher proportions.

If the dimethyl phosphates are ground, for instance, in a colloid mill, before addition to the nitrocellulose solution a higher degree of translucency can be obtained in the final film. The grinding process can be continued till the finest state of division is obtained and I get greater translucency the more finely the salts are ground.

This invention is a valuable advance in the art since it makes it possible to reduce the inflammability of gelatinized nitrocellulose compositions without the disadvantages of objectionable odor or color, while the retarding ingredients do not embrittle the plastic and in some cases even act as a plasticizer, and also those salts of dimethylphosphoric acid that exert a plasticizing action on the nitrocellulose also confer a high tolerance for inert fillers, even in a plastic containing a considerable proportion of nitrocellulose.

As many apparently widely different embodiments of this invention may be made without departing from the spirit and scope thereof, it is to be understood that I do not limit myself to the specific embodiments thereof except as defined in the appended claims.

I claim:
1. A nitrocellulose composition having incorporated therein a salt of dimethyl-phosphoric acid.
2. A gelatinized nitrocellulose composition having incorporated therein a salt of dimethyl-phosphoric acid.
3. A nitrocellulose composition having incorporated therein a salt of dimethyl-phosphoric acid which possesses plasticizing properties.
4. A nitrocellulose composition having incorporated therein an organic salt of dimethylphosphoric acid.
5. A nitrocellulose composition having incorporated therein a dimethylphosphoric acid salt of an organic nitrogen base.
6. A nitrocellulose composition having incorporated therein a dimethylphosphoric acid salt of an organic nitrogen base of low molecular weight.
7. A nitrocellulose composition having incorporated therein a dimethylphosphoric acid salt of an organic nitrogen base of low molecular weight and possessing plasticizing properties.
8. A nitrocellulose composition having incorporated therein a dimethylphosphoric acid salt of an organic nitrogen base of low molecular weight containing an active solvent group.
9. A nitrocellulose composition having incorporated therein a salt of dimethylphosphoric acid and an additional salt which reduces the inflammability of nitrocellulose without affecting its clarity.
10. A gelatinized nitrocellulose composition having incorporated therein a salt of dimethyl-phosphoric acid and a stable colorless salt, soluble in organic solvents and free from oxidizing action.

HAROLD J. TATTERSALL.